United States Patent Office 3,117,129
Patented Jan. 7, 1964

3,117,129
SALICYLOYL PYRIDINES
Richard J. Boyle, Neshanic, N.J., assignor to American Cyanamid Company, New York, N.Y., a corporation of Maine
No Drawing. Filed Feb. 18, 1959, Ser. No. 793,979
8 Claims. (Cl. 260—297)

This invention relates to new ultraviolet light absorbers and more specifically it relates to salicyloyl pyridines of the structure

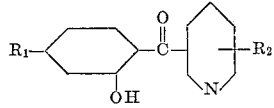

in which $R_1$ is hydrogen, hydroxyl, lower alkyl, alkoxy, chloro or bromo and $R_2$ is hydrogen or lower alkyl The plastics industry has long been faced with a serious problem in deterioration of light colored plastics upon exposure to light, transparent or light colored plastics upon long exposure to light undergo deterioration with resultant darkening. Recently, there have been developed a number of classes of compounds which are grouped together under the title of ultraviolet absorbers. These are designed to be incorporated into various plastics in order to prevent utlraviolet light from causing this deterioration.

With certain plastics, specific problems arise which require special properties in the ultraviolet absorbers. For example, polyvinyl chloride must be stabilized against both degradation by ultraviolet light and deterioration of heat, since polyvinyl chloride is given various degrees of heat treatment during the manufacture of articles. Each stabilization is of the utmost importance during this stage of its existence. However, since polyvinyl chloride is usually a light color or even translucent material it must also be stabilized against deterioration by ultaviolet light during its lifetime.

A problem with commercially available ultraviolet absorbers is color. To be a good ultraviolet absorber, the compound must absorb rather broadly in the near ultraviolet and yet must have a minimum of absorption in the visible range. In practice, a compromise is usually obtained by having an ultraviolet absorber which so slightly overlaps the visible range that its color is a very pale yellow. When compounds are obtained which have no visible color it is usually found that the absorption peak in the ultraviolet is shifted so far away from the visible as to be beyond the range wherein the most effective ultraviolet protection is obtainable.

I have found a new and different class of ulrtaviolet absorber which absorbs ultraviolet light at approximately the desired wave length and still possesses no visible color. Further, my new ultraviolet absorbers give improved protection to cellulose acetate polyvinyl chloride and other plastic materials with or without heat stabilization. The new ultraviolet light absorbers of my invention are 2-hydroxyphenyl pyridyl ketones which may carry further substitution in the 4-position of the phenyl ring. They are defined by the formula

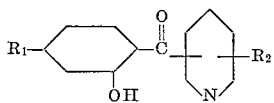

in which $R_1$ may be hydrogen, hydroxyl, lower alkyl, alkoxy, chloro or bromo and $R_2$ may be hydrogen or lower alkyl.

It is an advantage of the compounds of my invention that they combine good protection from ultraviolet light with freedon from visible color and are particularly effective as ultraviolet absorbers in a great many transparent, translucent or light colored plastics. In some respects, the compounds of my invention are superior to compounds of the prior art. For example, they have a low volatility and consequently have much less tendency to be lost in the material in which they are incorporated during any necessary heat treatment of the latter.

The compounds of my invention are prepared by the condensation of a pyridine carboxy chloride with an alkoxy or hydroxy benzene. In one such type of preparation the pyridine carboxy chloride is condensed with an alkoxy benzene in the presence of aluminum chloride or another Friedal-Crafts catalyst in a solvnet inert to the catalyst. The condensation occurs in a position ortho to the alkoxy group and the alkoxy group is then dealkylated by heating in the presence of the aluminum chloride to form the orthohydroxyphenyl ketone. Alkoxy benzenes which may be reacted in this synthesis include such compounds as meta-dimethoxybenzene, meta-chloroanisole, methylanisole and the like. The pyridine carboxylic acid chlorides may be picolinic acid chloride, nicotinic acid chloride, isonicotinic acid chloride or the acid chlorides of alkyl substituted pryidine carboxylic acids, such as 6-methyl nicotinic acid, 6-methyl picolinic acid and the like. Alternatively, the pyridine carboxylic acid is condensed with a phenolic compound in an inert solvent with boron trifluoride as a catalyst. This method, using the free acid instead of the acid chloride, produces condensation in a position ortho to the phenolic group. Phenolic compounds which may used are phenol, meta cresol, meta-methoxy phenol, meta-ethoxy phenol, meta-chloro phenol, meta-ethyl phenol, meta-butyl phenol, meta-bromo phenol, resorcinol and the like. The product from resorcinol by this procedure is of especial utility, since there are then para hydroxy groups in the phenyl ring which can then be selectively alkylated by any desired alkylating agent such as dimethyl sulfate, diethyl sulfate or an alkyl halide such as butyl bromide, octyl bromide, lauryl bromide and octadecyl bromide.

The compounds of my invention are especially useful in the protection of plastics, either transparent, translucent or light in color. With especial interest is such plastics as polyvinyl chloride, polyesters such as the alkyd, modified alkyd resins, thermo plastic synthetic fibers such as nylon and the like, polyalkylene, such as polyethylene, polypropylene, polystyrene and the like and as a protective element in a plastic layer in safety glass in order to protect the material behind the safety glass from deterioration by light as well as the plastic layer itself. In a similar manner, they are useful in various transparent wrapping materials, such as cellophone and other similar plastic materials, even when the plastic itself is not subject to deterioration by light, in order to protect material packaged in the wrapping material.

My invention may be further illustrated by the following examples in which parts are by weight unless otherwise indicated.

*Example 1*

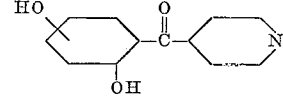

To a mixture of 12.3 parts of isonicotinic acid 11 parts of resorcinol and 110.7 parts of monochlorobenzene is added slowly 7.2 parts of boron trifluoride while the temperature is concurrently being raised to 60° C. The mixture is then heated at 90° C. until the reaction is substantially complete. The mono-chloro benzene layer is decanted and the solid residue is stirred in water (200 parts) containing 35 parts of sodium acetate. The slurry

Example 2

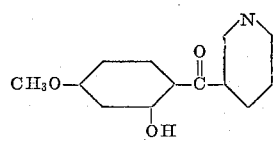

A mixture of 12.3 parts of nicotinic acid in 17.8 parts of thionyl chloride in 160 parts of tetrachloroethane is stirred at 40–50° C. until acid chloride formation is complete. The excess thionyl chloride is then distilled off at reduced pressure and 13.8 parts of resorcinol dimethyl ether is added. 16.7 parts of aluminum chloride is then added slowly into the resulting yellow slurry and the mixture is stirred at room temperature until revolution of hydrogen chloride has reduced to a minimum. An additional 10 parts of aluminum chloride is then added, the temperature is raised slowly to 90° C. The mixture is maintained at this temperature until the dealkylation is substantially complete. The mixture is then drowned in 250 parts of water containing 29.47 parts of concentrated hydrochloric acid. The drowned mixture is stirred for a short time while keeping quite warm. The tetrachloro ethane layer is separated, washed with water and extracted with sodium bicarbonate solution. The organic layer is again washed with water and steam stripped to remove the tetrachloro ethane. The residue is dissolved in 5% sodium hydroxide solution and the 3-(2-hydroxy-4-methoxy benzoyl)pyridine is precipitated by acidification with carbon dioxide. It can be purified by recrystallization from ethanol-water.

By treatment of the product with an additional mole of aluminum chloride in tetrachloroethane at 90° for 2 hours 3-(2,4-dihydroxybenzoyl)pyridine is obtained. This material is isolated by the procedure described in Example 3.

Example 3

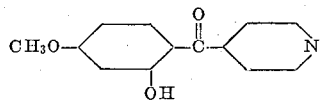

A mixture of 12.3 parts of isonicotinic acid and 81.90 parts of thionyl chloride is refluxed until the acid chloride formation is complete. The excess thionyl chloride is removed under reduced pressure, the solid residue is stirred with 55.35 parts of monochlorobenzene and 27.6 parts of resorcinol dimethyl ether while 16.7 parts of aluminum chloride is added gradually. The mixture is then stirred at room temperature until the condensation is substantially complete. An additional 10 parts of aluminum chloride is then added and the mixture is then heated at 85° C. until dealkylation is complete. The mixture is then added to 200 parts of water containing 58.95 parts of concentrated hydrochloric acid and the drowned mixture is stirred at 90–100° C. for a short time. The aqueous layer is separated and made strongly basic with 20% sodium hydroxide solution. The solution is then neutralized with dilute hydrochloric acid and the precipitated solid is collected. The extraction of this solid with boiling ethanol yields a crude 4-(2-hydroxy-4-methoxybenzoyl)pyridine, which can be further purified by recrystallization from ethanol.

Example 4

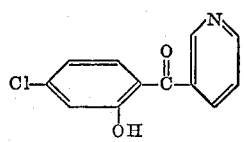

Using the procedure of Example 1 and substituting 12.8 parts of meta-chlorophenol for resorcinol affords 3-(2-hydroxy 4-chlorobenzoyl)pyridine.

3-(2-hydroxy-4-bromobenzoyl)pyridine is obtained when meta-bromophenol is substituted for resorcinol dimethyl ether in this procedure.

Example 5

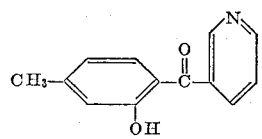

Using the procedure of Example 1 and substituting 10.8 parts of meta-cresol for resorcinol affords 3-(2-hydroxy-4-methylbenzoyl)pyridine.

Example 6

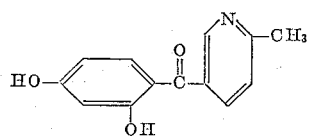

Using the procedure of Example 1 and substituting 13.7 parts of 6-methylnicotinic acid for isonicotinic acid affords 3-(2,4-dihydroxybenzoyl)-6-methylpyridine.

Example 7

A few milligrams of the indicated UV absorber is dissolved in acetone and the solution is added to an acetone solution of cellulose acetate. The mixture is stirred for 15 minutes and allowed to settle. Films are prepared by dipping a micro slide into the above solution, and allowing it to drain and drip. One side of the slide is peeled off and the film mounted. Spectrophotometric curves of both the film on glass and the mounted film are taken. Both films are heated for 15 hours at 70° C. and spectrophotometric curves again taken. The samples are then exposed in a Fade-ometer for 500 hours, with readings taken at 100-hour intervals. The percent of compound remaining is calculated by taking spectrophotometric curves before and after each exposure and comparing the transmittance at a given wavelength, usually the absorption maximum. Percent remaining at 100 hours $$\frac{D_{100}}{D_0} \times 100$$

where $D_0$ is the optical density after heating treatment and $D_{100}$ is the optical density of the film after 100 hours of exposure.

The results are given in the following table for the products of Examples 2 and 3.

| Compound | Max., mμ. | Percent Remaining | | | |
|---|---|---|---|---|---|
| | | 100 Hours | | 500 Hours | |
| | | N.H.T. | H.T. | N.H.T. | H.T. |
| 4-(2,4-Dihydroxybenzoyl) pyridine (P-220) | 326 | 96 | 95 | 84 | 91 |
| 3-(2-Hydroxy-4-methoxybenzoyl)-pyridine (P-240) | 325 | 90 | 93 | 80 | 92 |

(N.H.T.=non-heat treated.)
(H.T.=heat treated.)

I claim:
1. A compound of the formula

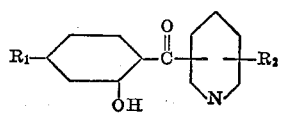

in which $R_1$ is selected from the group consisting of hydroxyl, lower alkyl, lower alkoxy, chloro and bromo and $R_2$ is selected from the group consisting of hydrogen and lower alkyl.

2. 4(2,4-dihydroxybenzoyl)pyridine.
3. 3-(2-hydroxy-4-methoxybenzoyl)pyridine.
4. 4-(2-hydroxy-4-methoxybenzoyl)pyridine.
5. 3-(2,4-dihydroxybenzoyl)pyridine.
6. 3-(2-hydroxy-4-chlorobenzoyl)pyridine.
7. 3-(2-hydroxy-4-bromobenzoyl)pyridine
8. 3-(2-hydroxy-4-methylbenzoyl)pyridine.

References Cited in the file of this patent

UNITED STATES PATENTS 2,921,078    Boehme _____ Jan. 12, 1960

OTHER REFERENCES

Beilstein (Handbuch, 4th edition, 1st supp.), volume 21, page 463 (1935).

Adams et al.: Chem. Abstracts, volume 43, column 3417 (1949).